United States Patent [19]

Kimura et al.

[11] Patent Number: 5,747,174
[45] Date of Patent: May 5, 1998

[54] BIAXIALLY ORIENTED, LAMINATED POLYESTER FILM

[75] Inventors: Masahiro Kimura; Kohzo Takahashi; Naotake Kashiwakura, all of Otsu; Kenji Tsunasima, Kyoto; Hirokazu Kurome, Otsu, all of Japan

[73] Assignee: Toray Industries, Inc., Japan

[21] Appl. No.: 783,791

[22] Filed: Jan. 15, 1997

Related U.S. Application Data

[63] Continuation of Ser. No. 527,481, Sep. 13, 1995, abandoned, which is a continuation of Ser. No. 140,016, filed as PCT/JP93/00228, Feb. 24, 1993, abandoned.

[30] Foreign Application Priority Data

| Feb. 25, 1992 | [JP] | Japan | 4-073228 |
| Oct. 26, 1992 | [JP] | Japan | 4-311451 |
| Oct. 26, 1992 | [JP] | Japan | 4-311452 |
| Nov. 13, 1992 | [JP] | Japan | 4-328678 |

[51] Int. Cl.$^6$ .......................... B32B 27/06; B32B 27/36
[52] U.S. Cl. ........................................ 428/480; 428/910
[58] Field of Search .................................. 428/480, 910

[56] References Cited

U.S. PATENT DOCUMENTS 4,636,442  1/1987  Beavers et al. .

FOREIGN PATENT DOCUMENTS 64-80528   3/1989  Japan .
4-221622   8/1992  Japan .

OTHER PUBLICATIONS

Whelan, T. *Polymer Technology Dictionary* pp. 173, 323 Chapman & Hall, London (1994).

*Primary Examiner*—Patricia A. Short
*Attorney, Agent, or Firm*—Austin R. Miller

[57] ABSTRACT

Disclosed is a biaxially oriented, laminated polyester film having a Young's modulus of 10–250 kg/mm$^2$ and formed by laminating layers of polyester B on both surfaces of a layer of polyester A whose main constituent is an ethylene terephthalate having a glass transition temperature of not higher than 50° C. This film not only has characteristics that the conventional polyester films do not possess, such as impact resistance, resistance to pinhole generation and low-temperature performance, but also is excellent in flexibility.

2 Claims, No Drawings

BIAXIALLY ORIENTED, LAMINATED POLYESTER FILM

This application is a continuation of application Ser. No. 08/527,481, filed Sep. 13, 1995, now abandoned, which is a continuation of application Ser. No. 08/140,016, filed Oct. 25, 1993, now abandoned.

TECHNICAL FIELD OF THE INVENTION

The present invention relates to a biaxially oriented, laminated polyester film, and more particularly, relates to a flexible polyester film having excellent characteristics such as impact resistance, resistance to pinhole generation and processability.

BACKGROUND ART OF THE INVENTION

A biaxially oriented polyethylene terephthalate (PET) film, which is a typical polyester film, is broadly used for industrial materials, magnetic recording materials, package materials, etc., because of good mechanical properties, thermal properties, moisture properties, and other excellent properties thereof.

In uses in which impact resistance and resistance to pinhole generation are important, however, biaxially oriented nylon films have mostly been used, and PET films are rarely used as main structural materials because PET films have a relatively large hardness which comes out as a turned-over property of a toughness. For example, in package materials, particularly in package materials for liquids (for example, a retort package), impact resistance and resistance to crumpling, which are represented by the strength in dropping of a package, and further low-temperature performances thereof are required, and in most cases biaxially oriented nylon films are used. In packages for liquids, a film made by laminating a sealant layer such as polyethylene or polypropylene layer on a biaxially oriented film is served for bag-making and a liquid is charged into the bag formed. In such packages for liquids, a strength in package drop test which tests whether a liquid leaks or not by breakage of a package or opening of a pinhole when the package after charge of the liquid is dropped, and a resistance to crumpling which is a property determined by testing whether pinholes are generated or not when the package is crumpled by a repeated external force, are considered to be important. Biaxially oriented nylon films are excellent in these properties.

On the other hand, there are problems on the properties of nylon films. In particular, the essential properties of nylon films that coefficient of moisture absorption and coefficient of expansion due to moisture thereof are large cause the problems that the flatness of a nylon film deteriorates when the film is kept in a form of a roll, that a deposition is difficult, and that the bonding force of a printed or laminated layer decreases when the film absorbs moisture. In a PET film, because coefficient of moisture absorption and coefficient of expansion due to moisture thereof are both small, there is no problem with moisture properties.

In the present invention, a flexibility is provided to a film in order to obtain properties similar to those of nylon films, and further, the moisture properties and processability of a PET film are also provided. Although a flexible single-layer film as disclosed in JP-A-HEI 4-221622 and JP-A-HEI 3-231930 is known as a conventional film, this film is poor in stretching property because an aliphatic dicarboxylic acid component is introduced, thereby causing problems that the flatness of the film deteriorates or that deterioration of the processability of the film such as an ability in deposition or printing occurs by reduction of the surface energy of the film.

DISCLOSURE OF THE INVENTION

An object of the present invention is to provide a polyester film having impact resistance and resistance to pinhole generation such as those of nylon films and having a processability such as that of PET films.

To accomplish this object, the present invention provides a biaxially oriented, laminated polyester film having a Young's modulus of 10–250 kg/mm$^2$ and formed by laminating layers of polyester B on both surfaces of a layer of polyester A whose main constituent is an ethylene terephthalate having a glass transition temperature of not higher than 50° C.

THE BEST MODE FOR CARRYING OUT THE INVENTION

As the acid component of the polyester according to the present invention, an aromatic dicarboxylic acid such as terephthalic acid, isophthalic acid, phthalic acid, naphthalene dicarboxylic acid, diphenyldicarboxylic acid, diphenylsulfonedicarboxylic acid, diphenyletherdicarboxylic acid, benzophenone dicarboxylic acid and ester-forming derivatives thereof; an aliphatic dicarboxylic acid such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid, heneicosanedioic acid, docosanedioic acid, tricosanedioic acid, tetracosanedioic acid, pentacosanedioic acid, hexacosanedioic acid, heptacosanedioic acid, octacosanedioic acid, nonacosanedioic acid, triacontanedioic acid and ester-forming derivatives thereof, a dimer acid obtained by dimerization of an unsaturated aliphatic acid having a carbon number of 10–25 and hydrogenated dimer acids thereof and ester-forming derivatives thereof; a cyclic dicarboxylic acid; and a polyfunctional acid can be used. Although the glycol component of the polyester is not particularly restricted, at least one kind of glycol component selected from aliphatic, cyclic and aromatic diols preferably can be used. Further, a polyether such as polyethylene glycol or polytetramethylene glycol, a polyamide or a polycaprolactone may be copolymerized.

The glass transition temperature of the polyester A according to the present invention is not higher than 50° C., preferably not higher than 45° C., more preferably not higher than 40° C., from the viewpoints of flexibility and resistance to pinhole generation. Further, although the above-described polyesters can be used as the polyester A. The polyester A according to the present invention is a polyester whose main constituent is an ethylene terephthalate from the viewpoints of stretching property, thermal resistance, chemical resistance and cost. Furthermore, the respective amounts of not less than 50 mol % of the acid component and the glycol component must be terephthalic acid ethylene glycol, and it is preferred that the respective amounts of not less than 70 mol % of the acid component and the glycol component are terephthalic acid component and ethylene glycol component. Particularly, it is preferred that not less than 80 mol % of the glycol component, preferably not less than 90 mol % thereof is ethylene glycol component, from the viewpoints of raw material recycle property in polymerization and thermal resistance.

In order to provide good flexibility and thermal resistance, as the aliphatic dicarboxylic acid component used in the polyester A whose main constituent is an ethylene terephthalate, adipic acid, sebacic acid, dodecanedioic acid and ester-forming derivatives thereof, and a dimer acid obtained by dimerization of an unsaturated aliphatic acid having a carbon number of 10–25 and hydrogenated dimer acids thereof and ester-forming derivatives thereof (hereinafter, referred to as "dimer acid component") preferably can be used at 1–50 mol % of the total acid component, preferably 5–30 mol % thereof. In particular, it is preferred that a long-chain aliphatic dicarboxylic component having an alkylene group of a carbon number of not less than 10 is contained at a content of 1–40 mol %, from the view points of resistance to pinhole generation and thermal resistance.

Particularly in order to make all the flexibility, the thermal resistance, the impact resistance and the resistance to pinhole generation good, long-chain aliphatic dicarboxylic components having divergent structures are preferred, and among such components, a dimer acid component is preferred. Although usually an unsaturated bond remains in a dimer acid, the bromine number thereof determined based on ASTM-D-1159 is preferably in the range of 0.05–10 (g/100 g), more preferably in the range of 0.1–5 (g/100 g), because the thermal resistance and the flexibility become excellent. The amount of copolymerization of a dimer acid relative to the acid component is in the range of 1–40 mol %, preferably in the range of 5–20 mol %.

In a case where the polyester A mainly constituting the flexible polyester film according to the present invention is, for example, a polyester whose main constituent is PET and which is copolymerized with an aliphatic dicarboxylic acid or the like for providing flexibility, it sometimes occurs that the melting point, the glass transition temperature and the crystallinity of the film decrease and that, in the process for producing a biaxially oriented film, adhesion of the film to a cooling drum at the time of casting, adhesion of the film to a stretching roll and adhesion of the film to clips in a tenter are likely to occur, thereby reducing the productivity. Further, if the amount of copolymerization increases, the biaxial stretching property of a single layer of the polyester A deteriorates, a one-to-one correspondence between the strains and the stresses disappears, and a so-called necking stretching occurs, thereby causing deterioration of the uniformity of the thickness. This bad biaxial stretching property is remarkable particularly in a flexible polyester whose main constituent is polybutylene terephthalate (PBT), and for example, in a PBT copolymerized with a dimer acid at 15 mol %, it is very difficult to obtain a flat biaxially oriented film.

Further, if a large amount of an aliphatic dicarboxylic acid is introduced to provide flexibility, the surface tension of the film extremely decreases as well as the slipping property thereof deteriorates, and the processability such as properties for deposition and printing deteriorates.

From such viewpoints, in the present invention, it is very important to laminate a polyester B on both surfaces of the flexible polyester A. As the polyester B, the aforementioned polyesters can be employed. Although the polyester B is not particularly restricted, a polyester whose main constituent is an ethylene terephthalate and whose glass transition temperature is not lower than 45° C., preferably not lower than 50° C., is preferred, from the viewpoints of film formation property and processability.

In the polyester B, it is preferred that the respective amounts of not less than 60 mol %, preferably not less than 80 mol %, of the acid component and the glycol component are terephthalic acid component and ethylene glycol component. Particularly, it is preferred that not less than 85 mol %, preferably not less than 90 mol %, of the glycol component is ethylene glycol component from the viewpoints of stretching property and recycle property. Conversely, a polyester whose main constituent is PET, a polyester whose main constituent is a polymer consisting of cyclohexanedimethanol and terephthalic acid, a PET copolymerized with isophthalic acid, and a PET copolymerized with an aliphatic dicarboxylic acid having an alkylene group with a carbon number of 4–8 such as adipic acid and sebacic acid can be used. In a case of a copolymer, the amount of the copolymerized component is in the range of 1–40 mol %, preferably in the range of 5–20 mol %.

Although the Young's modulus of the polyester film according to the present invention is in the range of 10–250 kg/mm$^2$, it is preferably in the range of 40–230 kg/mm$^2$, more preferably in the range of 50–200 kg/mm$^2$, from the viewpoints of handling, balance of flexibility and roll formation of the film. Further, the film according to the present invention must be biaxially oriented from the viewpoints of aging variation of Young's modulus, range of temperature in use, productivity and processability. Furthermore, the value of the surface orientation coefficient, Fn=(Nx+Ny)/2−Nz, which is determined from the refractive indexes in the longitudinal, transverse and thickness directions (Nx, Ny, Nz), is preferably not less than 0.005, more preferably not less than 0.01, particularly preferably in the range of 0.02–0.14 because the processability becomes good.

The polyester B is laminated on both surfaces of the flexible polyester A. Although the ratio of the thicknesses is not particularly restricted, the ratio of the sum of the thicknesses of layers of polyester A to the sum of the thicknesses of layers of polyester B is preferably in the range of 1:1–50:1, more preferably in the range of 2:1–25:1 (the sum of layers A:the sum of layers B). If the rate of layers B is too small, the improvement advantage of biaxial stretching property is injured, and it is not preferred. If the rate of layers B is too large, the flexibility and the impact resistance of the film are injured, and it is not preferred. The polyesters B laminated on both surfaces of the flexible polyester A may be slightly different from each other in composition within the range specified in the present invention.

In order to obtain a good bonding property between layers in the laminated film, for example, using two kinds of polymers A1 and A2 as the polyester A and the polyester B, a five layer lamination structure such as B/A1/A2/A1/B may be formed, and a lamination structure such as B/(A1+A2)/B may be formed by mixing the two kinds of polymers A1 and A2. Further, the laminated film may be formed blending polyester A and polyester B from the viewpoint of a raw material recycling property.

In the present invention, if the strength in piercing defined below is not less than 10 kg/mm, preferably not less than 15 kg/mm, more preferably not less than 20 kg/mm, for example, when the film is formed as a package by heat sealing, the durability of the package desirably increases.

The strength in piercing is determined by stretching a film on a ring having a diameter of 40 mm so as to cause no looseness, using a needle of a sapphire with a tip angle of 60 degrees and a tip R of 0.1 mm, piercing the center of the circle of the stretched film with the needle at a speed of 50 mm/min., and converting the force generated when the needle penetrates through the film into a value at a film thickness of 1 mm. It is preferred that the strength in piercing is not less than 50 kg/mm when the tip R of the needle is set to 0.5 mm, because the durability of a package against external contact materials, after solid materials are packed in the package, is excellent.

In the flexible polyester film according to the present invention, the value determined in Gelbo test is preferably not more than 20, more preferably not more than 10, from the viewpoint of durability when used as a package. The value determined in Gelbo test means the number of pinholes generated after Gelbo is performed 1000 times in the Gelbo flexing test described later. It is preferred that this value is small, because it indicates that the pinholes hardly open by simply repeated crumpling as well as that the strength in dropping of a package increases.

In the present invention, it is effective to add inert particles to layer B of polyester B to improve the slipping property. As the inert particles, particles of an inorganic compound such as silicon oxide, aluminum oxide, zirconium oxide, calcium carbonate and magnesium carbonate, or particles of an infusible organic compound such as crosslinked polystyrene, crosslinked divinylbenzene, benzoguanamine and silicone can be used. Particularly, colloidal silica, ground silica, crosslinked polystyrene and silicone particles are preferred from the viewpoint of transparency. Although the diameter and content of the particles are not particularly restricted, the mean particle diameter is preferably in the range of 0.01–10 μm, more preferably in the range of 0.1–5 μm, and the content is preferably in the range of 0.001–50% by weight, more preferably in the range of 0.05–1% by weight. Further, particles may be contained in the polyester A within a range which does not injure the above characteristics.

It is preferred to use particles having a mean particle diameter larger than the thickness of the layer of the polyester B in order to further improve the slipping property. The mean particle diameter is defined as a diameter corresponding to 50% by volume of the diameter of an equivalent sphere of particles determined by observing the particles in the film using an electron microscope.

Although the thickness of the film according to the present invention is not particularly restricted, the film can be effectively used by controlling the thickness in the range of 1–1000 μm, preferably in the range of 5–500 μm.

Next, the process for producing the film according to the present invention will be explained, but it is not limited by the following process.

Polyester A and polyester B are melt-extruded by separate extruders, the two kinds of polymers are extruded and laminated in the form of a sheet with a lamination structure of B/A/B using a feed block or a die having a composite manifold, and the sheet is cast accompanying a rapid cooling. The cast sheet obtained is subjected to the usual sequential biaxially stretching film formation process in which a longitudinal stretching, a transverse stretching and a heat treatment are performed. As other processes, a simultaneous biaxially stretching process and a tubular process can be employed.

To achieve the properties of the flexible polyester film specified in the present invention in the above-described sequential biaxially stretching process or simultaneous biaxially stretching process, draw ratio and temperature for heat treatment are important. As the result of many examinations, particularly the strength in piercing is affected by the draw ratio and the temperature for heat treatment, the draw ratio (draw ratio of longitudinal stretching x draw ratio of transverse stretching) is preferably in the range of 5–25 times, more preferably in the range of 6–20 times, and the temperature for heat treatment is preferably in the range of 120°–240° C., more preferably in the range of 130°–230° C. In both cases of a low draw ratio and a high draw ratio, the strength in piercing rapidly decreases. In a case of a low temperature for heat treatment, the strength in piercing is low, and in the case of a high temperature for heat treatment, film breakage occurs.

Further, it is preferred that the temperature for heat treatment is not higher than the temperature of the melting point of polyester A, preferably not higher than a temperature of the melting point $-10°$ C., because the Gelbo property becomes good. The temperature for heat treatment in the present invention means the temperature of the fusion peak of metacrystal remaining as a result of a heat history of the heat treatment and generated by thermal crystallization, which is observed by using a differential scanning calorimeter, and it does not always coincide with the temperature of a heat treatment roll or the temperature of the atmosphere in an oven in the film formation process.

In the flexible polyester film according to the present invention, an additive such as an antistatic agent, a thermal stabilizer, an antioxidant, a crystal nuclei agent, a weatherproofing agent, an ultraviolet absorbent, a pigment and a dye may be added within an amount which does not injure the object of the present invention. Further, surface roughening such as an embossing finish and sand mat finish or surface treatment such as a corona discharge treatment, plasma treatment and alkali treatment may be carried out as needed. Furthermore, in the flexible polyester film according to the present invention, coating and printing of a good-bonding treatment agent, an antistatic agent, a water vapour gas barrier agent (for example, polyvinylidene chloride), a releasing agent, an adhesive agent, a bonding material, a flameproofing agent, an ultraviolet absorbent, a mat-finishing agent, a pigment and a dye may be conducted, and a metal such as aluminum, aluminum oxide, silicon oxide and palladium or a compound thereof may be vacuum deposited for the purpose of shielding of a light, water vapour gas barrier, or providing of a surface conductivity or an infrared ray reflection property, and the methods and the purposes are not restricted by those above-described.

Particularly when employed for the use which requires a barrier property, it is preferred that a thin layer of a metal or a metal compound is laminated on at least one surface of the aforementioned laminated polyester film. This thin layer is preferably a thin layer of aluminum or a transparent thin layer made from aluminum or silicon oxide. These thin layers can be formed on at least one surface of the biaxially oriented polyester film having a flexibility by deposition. Because of deposition on a PET system polyester film, the deposition property is much more excellent as compared with that on a nylon film, and a desired deposition can be easily performed. By the lamination of this thin layer, a flexibility of the flexible polyester film, which corresponds to flexibility of a biaxially oriented nylon film, can be maintained while an excellent gas barrier property can be ensured.

Particularly, if the heat shrinkage at 100° C. of the biaxially oriented polyester film is controlled to not more than 5% in the above-described thin layer laminated flexible polyester film, generation of wrinkles on a cooling can can be effectively prevented.

Further, if the Young's modulus of the biaxially oriented polyester film at a room temperature is controlled to not less than 50 kg/mm$^2$, the adhesion strength of the thin layer in deposition can be increased besides increasing the strength in dropping of a package and the resistance to crumpling, and further, damage due to heat on the can also can be prevented. Furthermore, when a product composed of the thin layer laminated flexible polyester film is used, cracking of the deposition layer also can be prevented.

As polyester B, polyethylene terephthalate, PET copolymerized with isophthalic acid, and PET copolymerized with an aliphatic acid having an alkylene group with a carbon number of 4–8 such as adipic acid and sebacic acid, are preferred in order to strongly bond a thin layer of a metal or a metal compound with the polyester B. Particularly, in order to improve the barrier property and the bonding property, it is preferred that a corona discharge treatment is performed on the polyethylene terephthalate, and PET copolymerized with an aliphatic acid having an alkylene group with a carbon number of 4–8 and PET copolymerized with isophthalic acid are preferred. In order to further improve the bonding property, it is preferred that the temperature for heat treatment is controlled at a temperature of not lower than 200° C. and the film is rapidly cooled after heat setting.

When the film is employed for a use which requires a heat sealing property, it is preferred that the melting point of at least one polyester (heat sealing polyester) of the polyester B, which are laminated on both surfaces of polyester A, is not higher than a temperature of the melting point of the polyester A−10° C. Further, polyesters $B_1$ and $B_2$ different from each other in composition and melting point may be used as the polyester B to form a lamination structure such as $B_1/A/B_2$. It is preferred that the melting point of this heat sealing polyester is not higher than 200° C. As preferable heat sealing polyesters, for example, copolymerized polyesters such as polybutylene terephthalate copolymerized with isophthalic acid component and polyethylene terephthalate copolymerized with isophthalic acid component can be employed, but it is not particularly limited as long as the polyester is a resin which has a good bonding property between heat sealing polyesters.

This laminated resin layer is formed by, for example, laminating a heat sealing polyester on polyester A by co-extrusion, biaxially stretching the laminated film and thereafter conducting a heat treatment. A heat sealing polyester layer as described above can be formed by controlling the temperature for the heat treatment not lower than the melting point of the heat sealing polyester and not higher than the melting point of the polyester A. The thickness of the heat sealing resin layer is in the range of 0.01–20 μm, preferably in the range of 0.1–10 μm.

Since the base layer of the biaxially oriented polyester film according to the present invention is a flexible polyester film, the seal force of the film can be increased, and lack of seal force due to cleavage in a usual PET film can be solved.

Further, in the above-described heat sealing polyester film, it is preferred that the Young's modulus at 100° C. of the biaxially oriented polyester film is not less than 20 kg/mm² and the heat shrinkage is not more than 5% to effectively prevent generation of wrinkles on a cooling can.

When the film is employed for use in agriculture, it is preferred that an ultraviolet absorbent or a weatherproofing agent is contained at a content of not more than 5% by weight in order to provide transparency, weatherproofing property and flexibility.

Although the ultraviolet absorbent or the weatherproofing agent is not particularly restricted, an ultraviolet absorbent such as benzophenone system or triazole system absorbent, and inorganic particles such as titanium oxide or zinc oxide particles can be used, from the viewpoints of thermal resistance and transparency. Further, the agent is preferably added in layer B at a content more than that in layer A from the viewpoints of transparency, weatherproofing property and cost.

As the rate of the addition, for example, the content for layer B is 10% by weight and the content for layer A is 3% by weight.

Transparency and weatherproofing property required for an agricultural film can be provided by adding ultraviolet absorbent to the flexible polyester film at a content of not more than 5% by weight, and at the same time, the flexibility as aforementioned can be maintained. The workability of the film can be improved by this flexibility, and a durability capable of preventing a breakage due to hailstone and a flexibility capable of absorbing a fluttering due to wind can be provided.

When the film is employed for use of a package which requires a good heat shrinkage property, it is preferred that the heat shrinkage of the film at least in one direction at a temperature of 100° C. is not less than 25%. To achieve such a high heat shrinkage, the draw ratio and temperature for heat treatment are important, and for example, in a sequential biaxially stretching, it is preferred that the draw ratio of longitudinal stretching is controlled not less than 3.5 times, preferably not less than 4.0 times, and the draw ratio of transverse stretching is controlled not more than 4.0 times, preferably not more than 3.5 times. The temperature for heat treatment is preferably not higher than 150° C., more preferably not higher than 100° C., further more preferably not higher than 80° C.

Further, in the film according to the present invention, the maximum of the heat shrinkage stress is preferably not more than 1.1 kg/mm², more preferably not more than 1.0 kg/mm², particularly preferably not more than 0.8 kg/mm².

Since the above-described film has not only a flexibility such as that of a polyethylene but also an appropriate heat shrinkage property and a low heat shrinkage stress, for example, in the use of shrink package wherein the film is used as a closure of an aluminum container, the deformation of the container can be prevented.

When the film is employed for use requiring a transparency and gas barrier property, it is preferred that a resin coating layer or a resin laminating layer is provided on at least one surface of the polyester film according to the present invention.

For example, a polyvinylidene chloride layer is preferably used as the resin coating layer and a ethylene-vinylalcohol copolymer layer is preferably used as the resin laminating layer. Further, an anchor layer may be provided between the gas barrier layer and the film according to the present invention.

When a good bonding property is provided to the film according to the present invention, it is preferred that the wetting tension of at least one surface of the film is not less than 40 dyne/cm, preferably not less than 45 dyne/cm, more preferably not less than 50 dyne/cm to effectively improve the bonding property. As the method thereof, for example, a corona discharge treatment, a corona discharge treatment in an atmosphere of nitrogen or carbon dioxide, a plasma treatment, a flame treatment and solvent treatments can be applied. By such a surface treatment for providing a good bonding property, the bonding property to a printing ink, a deposited layer of a metal or a metal compound, or to other resin layers, can be improved while maintaining the flexibility and mechanical properties.

Further, the film can be appropriately used as a cover film, particularly as a cover film for a photo resist used in a photosensitive printing plate, by controlling the wetting tension to not more than 36 dyne/cm.

As such a polyester film for a cover film, a polyester film having voids therein and having a specific gravity of 0.5–1.2 is also preferred from the viewpoints of low Young's modulus, high haze and rough surface. Such a polyester film having voids can be obtained by, for example, as disclosed in JP-B-SHO 43-12013, JP-B-SHO 60-30930, JP-A-HEI 2-29438, JP-A-HEI 3-120027 and JP-A-HEI 2-26739, adding a resin insoluble with polyester, for example, an olefin system polymer such as polypropylene, polyethylene, polymethylpentene or polyphenylene oxide, and inert particles, for example, inorganic particles such as calcium carbonate, barium sulfate or titanium dioxide particles, in a form of single use or together use to polyester at a content of 1–50% by weight, and thereafter, stretching the film to form a low specific-gravity polyester film having many voids therein. Of course, a thin polyester layer having no voids or having a small amount of voids can be laminated on at least one surface of the low specific-gravity film. If the specific gravity of this film decreases down to not more than 0.5, because a cleavage is liable to occur when the film is peeled, it is not preferred. If the specific gravity is more than 1.2, because preferred properties on rough surface, haze and shielding property cannot be provided, it is not preferred.

In the present invention, a cover film is preferred which has a layer whose main constituent is a wax system composition on at least one surface of the above-described polyester film, and preferably in which long and slender protrusions with a ratio of length/width of not less than 3 are formed on the surface at a number of not less than 20/100 µm$^2$. Where, the "main constituent" means a constituent of not less than 50% by weight relative to the weight of the composition of the laminated layer, preferably not less than 60% by weight. As the wax system composition, various waxes on the market, for example, petroleum system wax, plant system wax, mineral system wax, animal system wax and low molecular polyolefin, can be used. Although the wax is not particularly restricted, in the present invention, petroleum system wax and plant system wax are preferred from the viewpoint of peeling property. As the petroleum system wax, paraffin wax, microcrystalline wax and wax oxide can be used, and among these waxes, wax oxide is particularly preferred from the viewpoint of protrusion formation property. As the plant system wax, candelilla wax, carnauba wax, haze wax, olicurie wax, sugar cane wax and rosin modified wax can be used, and in the present invention particularly the waxes having the following compositions are preferred. Namely, rosin, non-uniform rosin, or hydrogenated rosin·αβ-substituted ethylene (α-substitution group: carboxyl, β-substitution group: hydrogen, methyl or carboxyl) added material·alkyl or alkenyl (carbon number: 1–8) poly (repeated unit: 1–6) alcohol added with ester is preferably used from the viewpoints of good slipping property and peeling property, and further, the wax is more preferably used as a mixture with the above-described wax oxide. Namely, fine, long and slender protrusions can be formed by stretching the film uniaxially after applying the above composition, and a wax dissolved, emulsified and suspended in water is particularly preferred from the viewpoints of protrusion forming property, explosion-proof property and prevention of environmental pollution.

The mixing ratio by weight of petroleum system wax/plant system wax is preferably in the range of 10/90–90/10, more preferably in the range of 20/80–80/20, further more preferably in the range of 30/70–70/30. The reason why the amount of the plant system wax is not less than 10% by weight is to provide a good slipping property at a high temperature and a peeling property, and to achieve uniform dispersion when the wax is emulsified and suspended in water and obtain a uniform coating layer. The reason why the amount of the petroleum system wax is not less than 10% by weight is to obtain a good slipping property due to the formation of the protrusions of the coating layer as well as to obtain a good handling ability at the time of a high-speed lamination.

In the present invention, when an oil substance is further added to the above-described wax system composition to form a mixture, a particularly excellent peeling property can be obtained under a severe condition such as a high-temperature treatment. The oil substance means an oil which is present in a liquid or a paste state at room temperature, and plant oils, fats and fatty oils, mineral oils and synthesized lubricant oils can be used. As the plant oils, linseed oil, kaya oil, safflower oil, soybean oil, chinese wood oil, sesame oil, maize oil, rape seed oil, bran oil, cotton-seed oil, olive oil, sasanqua oil, tsubaki oil, caster oil, peanut oil, palm oil and coconut oil can be used. As the fats and fatty oils, beef tallow, pig tallow, sheep tallow and cacao butter can be used. As the mineral oils, machine oil, insulating oil, turbine oil, motor oil, gear oil, cutting oil and liquid paraffin can be used. As the synthesized lubricant oils, any of the oils satisfying the requirements described in the chemical dictionary published by Kyoritsu (a Japanese publisher) can be used, and for example, olefin polymerized oil, diester oil, polyalkylene glycol oil and silicone oil can be used. Among these oils, mineral oils and synthesized lubricant oils having a good running ability in an area of a large pulse width are preferred. Further, a mixture of these oils may be used.

The above-described oil substance is preferred to be added at a content of 1–100 parts by weight, preferably 3–50 parts by weight, relative to the wax system composition of 100 parts by weight. If the content of the oil substance is less than 1 part by weight, the peeling property in a high-temperature and high-moisture area tends to decrease, and if the content is more than 100 parts by weight, the peeling property in a low-temperature and low-moisture area tends to decrease. By controlling the content in the above range, sticking does not occur in a broad temperature and moisture condition and a good peeling property can be obtained.

In the above-described composition, various additives can be used together as long as the advantages according to the present invention are not injured. For example, antistatic agent, heat resisting agent, antioxidant, organic and inorganic particles and pigment can be used.

Further, in order to improve the dispersion property in water and the coating property, various additives, for example, dispersion assistant, surface active agent, antiseptic agent or antifoaming agent, may be added.

The thickness of the laminated layer whose main constituent is the wax system composition is preferably not less than 0.005 µm, more preferably not less than 0.01 µm. If the thickness of the laminated layer is less than 0.005 µm, sticking tends to occur.

Further, the inventors of the present invention found that a laminated layer extremely excellent in sticking resistance, peeling property, releasing property and handling ability and excellent in lamination property and adhesion property to a surface of a photo resist as compared with a conventional technology, can be obtained by forming protrusions specified as follows on the surface of the laminated layer. Namely, in the present invention, it is preferred that long and slender protrusions with a ratio of length/width of not less than 3 are formed on the surface of the laminated layer at a number of 20/100 µm². Because the protrusions are formed by the main constituent of wax system compositions and oil substances, the protrusions become molten at a high temperature, and the protrusions are different from protrusions formed by inorganic particles and indicate extremely excellent peeling property and releasing property.

In the film according to the present invention, the wetting tension of the surface is preferably not more than 36 dyne/cm, more preferably not more than 32 dyne/cm. This is for improving the peeling property to a photo resist surface. If the surface tension is out of the range, when the film is peeled, the film is likely to be deformed, or a defect is liable to occur on the photo resist surface. The wetting tension of the surface can be controlled by surface coating. Further, the haze of the film according to the present invention is preferably not less than 10%, more preferably in the range of 20–60%. If the haze is less than 10%, the photo resist is deteriorated by sensitization due to ultraviolet radiation. Further, this also contributes to improving the handling ability due to a colored cover film.

Further, the roughness density PC-1 of the surface of the film, determined by a roughness of not less than 1 µm, preferably in the range of 2–5 µm, must be not less than 10/mm. By controlling the roughness density PC-1 determined by a roughness of not less than 1 µm to not less than 10/mm, when the film is peeled from a photo resist, the film can be peeled smoothly and without irregularity of peeling, and the photo resist is not damaged. If the roughness density PC-1 determined by a roughness of not less than 1 µm is less than 10/mm, the bonding force with a photo resist becomes too strong, the peeling property deteriorates, and wave-like scratches are generated on the photo resist, and it is not preferred.

Further, when the film is used as a cover film for DFR, if the roughness density PC-1 determined by a roughness of not less than 1 µm is less than 10/mm, the photo resist present at a winding portion near a core in the radial direction becomes oxygen deficient, and it is not preferred. Namely, in a DFR process in which a photo resist is applied on a base film of a biaxially oriented polyester film, a cover film according to the present invention is laminated on the base film and the laminated film is wound in a form of a roll with a large length, the photo resist present at a winding portion near a core is prevented from being in an oxygen deficient condition by air layers present at a space between the photo resist and the cover film and at a space between the base film of a biaxially oriented polyester film and the cover film according to the present invention, and from being self crosslinked.

When the film is employed in use for electrical insulating, it is preferred that the weight ratio (M/P) of an alkali metal element and/or an alkali earth metal element (hereinafter, referred to as "M") to a phosphorus element (hereinafter, referred to as "P") in the polyester is in the range of 0.5–5.0, preferably in the range of 0.6–2.0, because the amount of oligomer in the film can be decreased.

The flexible polyester film according to the present invention can be employed for uses in which a usual biaxially oriented PET film is employed, and although the uses are not particularly limited, the film can be employed in uses for industrial materials such as package materials, releasing materials, transfer materials, electrical insulating materials, printing plate materials, adhesive sheets and agricultural house materials, and further as laminated materials with a film, a sheet, a metal foil, a paper, a woven fabric, a nonwoven fabric and a foamed material. In the use for package materials, the film is appropriately employed particularly for a use requiring an impact resistance, a resistance to crumpling and a low-temperature performance in which a biaxially oriented nylon film has been employed, and it is further preferred for a use of package for a liquid. Further, the film can be used in the fields applied with an aluminum deposition or a water-color ink which cause troubles by use of the conventional biaxially oriented nylon films. Furthermore, although, in most cases, a PET film and a nylon film are laminated for the conventional uses, because the film according to the present invention has characteristics of both the films, the film can be substituted for the conventional laminated film.

Next, methods for determining and estimating the characteristics in the present invention will be hereunder explained.

(1) Melting point (Tm), Glass transition temperature (Tg)

The measurement is performed by using a differential scanning calorimeter DSC2 (produced by Perkin Elmer Corporation). Ten milligrams of a sample is maintained in a molten state under a condition of 280° C. for 5 minutes, and thereafter, the sample is rapidly cooled in nitrogen liquid. A variation of the specific heat based on the transfer from a glass state to a rubber state is read in the process in which the rapidly cooled sample is heated at a rate of 10° C./min, and this temperature is defined as the glass transition temperature (Tg) and an endothermic peak temperature based on the crystal melting is defined as the melting point (Tm).

(2) Mean particle diameter

The particles in the film are observed using an electron microscope, and a diameter corresponding to 50% by volume of the diameter of an equivalent sphere of the observed particles is defined as the mean particle diameter.

(3) Coefficient of dynamic friction µd

The coefficient of dynamic friction (µd) is determined based on ASTM-D-1894B-63.

(4) Haze

The haze is determined based on ASTM-D-1003-61, and the haze converted into a value at 100 µm ($H_{100}$) is calculated from the following equation:

$$H_{100} (\%) = H \times 100/d$$

wherein, H is the actual data of the haze (unit: %), and d is the film thickness of the haze measuring portion (unit:µm).

(5) Mechanical properties

Tensile Young's modulus, strength at break and elongation at break are measured based on ASTM-D-882-81 (method A).

(6) Heat shrinkage

The heat shrinkage is determined by heat treating a film sample with a length of 200 mm and a width of 10 mm in a hot air oven with no load, measuring the amount of shrinkage at that time and determining the rate relative to the length of the sample.

(7) Strength in piercing

The strength in piercing is determined by stretching a film on a ring having a diameter of 40 mm so as to cause no looseness, using a needle of a sapphire with a tip angle of 60 degrees and a tip R of 0.1 mm, piercing the center of the circle of the stretched film with the needle at a speed of 50 mm/min., and converting the force generated when the needle penetrates through the film into a value at a film thickness of 1 mm. Further, the strength in piercing under a condition of the tip R of 0.5 mm is also determined, and the resulted data are described in the parentheses in the tables.

(8) Gelbo test

The temperature of the atmosphere in a Gelbo tester is set to 5° C., and the number of pinholes are compared on a film sample (280 mm×180 mm) before and after Gelbo is repeated 1000 times (the number of the portions through which an ink is penetrated on a filter paper is determined).

(9) Package test

Using a film laminated with a polypropylene sheet having a thickness of 50 μm, a package in which rice of 5 kg is stored is made by sealing the film at four sides using an impulse sealer.

After conveying the packages under a condition where ten packages are stacked, the durability of the packages is determined from the state of the packages as follows.

Rank A: There are no defects such as holes and breakage on the package.

Rank B: Although there occurs a slight elongation on the package, there is no problem in a practical use.

Rank C: Defects such as holes and breakage are occur on the package.

(10) Package drop test

Using a film laminated with a crystallized polypropylene sheet having a thickness of 50 μm, ten packages each storing water of 200 cc and having a size of 80 mm×180 mm are made by sealing the film at four sides using an impulse sealer. The packages are dropped from a height of 1 m, and the number of the packages which are broken or from which water leaks is determined.

(11) Water vapour permeation rate

The water vapour permeation rate is determined under a condition of 40° C. and 100%RH using a water vapour permeation rate measuring apparatus (W825 type; produced by Honeywell Corporation).

(12) Oxygen permeation rate

The oxygen permeation rate is determined under a condition of 20° C. and 0% RH using an oxygen permeation rate apparatus (OX-TRAN 100; produced by Modern Controls Corporation) based on ASTM-D-3985.

(13) Heat seal strength

After heat sealing a film with an impulse sealer (130 type; Fuji impulse sealer), the bonding strength per a width of 1 cm (kg/cm) is determined.

(14) Durability

A film is stretched on a frame with four sides each having a size of 1 m, and after a sediment is dropped onto the film, the durability of the film is determined by observing the external appearance of the film as follows.

Rank A: There is no defect such as holes and breakage on the film.

Rank B: Although there occur slight scratches on the film, there is no problem in a practical use.

Rank C: Defects such as holes and breakage are occur on the package.

(15) Weatherproofing property

A test of weatherproofing property is performed using a sunshine weather meter, and the retention of the elongation at break after 500 hours relative to the initial value is calculated.

(16) Roughness density PC-1

The surface roughness of a film is measured by a surface roughness meter. The measuring conditions are as follows, and the roughness density is determined from the 20 measurements. A measuring apparatus SE-3E produced by Kosaka kenkyusyo Corporation is used.

Radius of the tip of probe: 2 μm
Load of the probe: 0.01 g
Measuring length: 5 mm
Cut off: 0.25 mm

(17) Peeling property

A sample is laminated on a photo resist at a temperature of 25° C. under a condition of a yellow lamp, and the sample is cut at a width of 25 mm. Then, the sample is peeled at an angle of 90 degrees in a tensile tester, and the peeling property is determined from the bonding strength, the sound at the time of the peeling and the surface state of the photo resist after peeling as follows.

○: The peeling is smoothly performed and there is no sound of the peeling. There is no wave-like scratches on the surface of the photo resist after peeling. The bonding strength is not more than 10 g/cm.

Δ: Although there is no sound of the peeling, there occur defects on the surface of the photo resist, and the bonding strength is in the range of 10–50 g/cm.

X : The bonding strength is large and there is a sound of the peeling, and there occur wave-like scratches on the surface of the photo resist after peeling.

(18) Surface wetting tension

The surface wetting tension is determined at 20° C. and 65%RH based on ASTM-D-2578 (67T).

(19) Self-crosslinkage of photo resist of DFR

A film is wound by 500 m as a DFR and it is placed under a condition of a yellow lamp for six months, and thereafter, the self-crosslinkage of the photo resist in the DFR is determined at a portion of a surface layer (surface-layer portion) and at a portion near a core (core portion) as follows.

○: There is no self-crosslinkage of the photo resist at both the surface-layer portion and the core portion.

X : A part of the photo resist at the surface-layer portion or the core portion is crosslinked.

The present invention will be hereunder explained in more detail by examples. However, the present invention is not limited by the examples.

EXAMPLE 1

Using terephthalic acid of 90 mol % and hydrogenated dimer acid with a carbon number of 36 of 10 mol % as a dicarboxylic acid component and ethylene glycol of 100 mol % as a diol component, copolymerized polyester A (Tm: 234° C., Tg: 33° C.) with an intrinsic viscosity of 0.70 (determined at 25° C. using o-chlorophenol) was prepared by a known method. On the other hand, using terephthalic acid as a dicarboxylic acid component and ethylene glycol as a diol component and adding silicon oxide particles having a mean particle diameter of 4.2 μm so that the content thereof was 0.1% by weight, a polyethylene terephthalate with an intrinsic viscosity of 0.68 [polyester B (Tm: 258° C., Tg: 76° C.)] was prepared by a known method.

After these two kinds of copolymerized polyesters were dried by a known vacuum dryer, polyester A was supplied to an extruder with a diameter of 90 mm and polyester B was supplied to an extruder with a diameter of 40 mm, and polyester A was melt-extruded at 270° C. and polyester B was melt-extruded at 280° C. After the polyesters were laminated so as to be in a three-layer lamination structure of polyester B/polyester A/polyester B (ratio of lamination thicknesses: 1:20:1), the polymer was enlarged in the width direction in a die, and the polymer was delivered out from a slit with a width of 1.0 mm of the die in a form of a sheet. The sheet was cast, cooled and solidified on a casting drum controlled at 25° C. applying an electrostatic charge. The sheet was then stretched in the longitudinal direction by stretching rolls at a temperature of 70 ° C. and a draw ratio of 3.3 times, stretched in the transverse direction in a tenter at a temperature of 80° C. and a draw ratio of 3.3 times, and heat treated at a temperature of 220° C. for five seconds to form a biaxially oriented flexible polyester film having a thickness of 15 µm and a heat treatment temperature of 210° C. The film obtained is good in flexibility, strength in piercing, Gelbo property, transparency and uniformity in thickness, and there were no problems on stretching property and adhesion to rolls in the film formation process. The results of package test and package drop test were both excellent as shown in Table 1.

EXAMPLE 2

The central layer was formed from a mixture of polyester A of 95 parts by weight and polyester B of 5 parts by weight of Example 1, and polyester B was the same as that of Example 1, to form a film in a manner similar to that of Example 1. The film obtained was excellent in transparency and had the characteristics equivalent to those in Example 1, as shown in Table 1.

EXAMPLE 3

A film having a thickness of 15 µm was formed in a manner similar to that of Example 1 other than changing the polyester A of Example 1 to a PET copolymerized with sebacic acid of 20 mol % (Tm: 218° C., Tg: 34° C.) and setting the heat treatment temperature to 120° C. In the characteristics of the obtained film, the strength in piercing and the Gelbo property slightly deteriorated and the results of package test and package drop test were both slightly poor, as shown in Table 1.

EXAMPLE 4

Setting the mean particle diameter of the silicon oxide particles of Example 1 to 3.5 µm and the ratio of the lamination thicknesses of the laminated sheet to 1:10:1, the sheet was cast, cooled and solidified on a casting drum controlled at 25° C. applying an electrostatic charge similarly to in Example 1. The sheet was then stretched in the longitudinal direction by stretching rolls at a temperature of 70° C. and a draw ratio of 3.4 times, stretched in the transverse direction in a tenter at a temperature of 80° C. and a draw ratio of 3.5 times, and heat treated at a temperature of 225° C. for five seconds to form a biaxially oriented flexible polyester film having a thickness of 15 µm and a heat treatment temperature of 213° C.

A corona discharge treatment was performed on one surface of the obtained film to control the surface tension to 54 dyne/cm, and an aluminum was vacuum deposited thereon. Because the moisture absorption property was low, the vacuum degree sufficiently increased and the deposition was easy. The thickness of the aluminum thin layer was about 150 nm, and the layer was not peeled even if the peeling test with an adhesive tape was performed, and the adhesive force thereof was good. Moreover, the water vapour permeation rate was 2.1 g/m²·day·sheet and the oxygen permeation rate was 1.8 cc/m²·day·sheet, and the film thus indicated a good gas barrier property.

EXAMPLE 5

A film having a thickness of 20 µm was formed in a manner similar to that of Example 1 other than changing the polyester B of Example 1 to a PET copolymerized with isophthalic acid (isophthalic acid component: 25 mol %, Tg: 72° C., Tm: 195° C.) and setting the ratio of the lamination thicknesses to 1:2:1, and setting the temperature for melting the polyester B to 230° C. The obtained film indicated a high seal strength of 2.1 kg/cm as shown in Table 2.

EXAMPLE 6

Using terephthalic acid of 80 mol % and hydrogeneted dimer acid with a carbon number of 36 of 20 mol % as a dicarboxylic acid component and ethylene glycol of 100 mol % as a diol component, copolymerized polyester A (Tm: 210° C., Tg: 1° C.) with an intrinsic viscosity of 0.75 was prepared by a known method. On the other hand, using terephthalic acid of 90 mol % and sebacic acid of 10 mol % as a dicarboxylic acid component and ethylene glycol of 100 mol % as a diol component and adding silicon oxide particles having a mean particle diameter of 4.2 µm so that the content thereof was 0.1% by weight, polyester B (Tm: 233° C., Tg: 55° C.) with an intrinsic viscosity of 0.70 was prepared by a known method. In these polyesters, benzophenone system ultraviolet absorbent (product name: "Mark LA") was added to and blended with the polyester B at a content of 3% by weight relative to the weight of the polymer.

After these two kinds of copolymerized polyesters were dried by a known vacuum dryer, polyester A was supplied to an extruder with a diameter of 90 mm and polyester B was supplied to an extruder with a diameter of 40 mm, and polyester A was melt-extruded at 260° C. and polyester B was melt-extruded at 270° C. After the polyesters were laminated so as to be in a three-layer lamination structure of polyester B/polyester A/polyester B (ratio of lamination thicknesses: 1:5:1), the polymer was enlarged in the width direction in a die, and the polymer was delivered out from a slit with a width of 1.0 mm of the die in a form of a sheet. The sheet was cast, cooled and solidified on a casting drum controlled at 25° C. applying an electrostatic charge. The sheet was then stretched in the longitudinal direction by stretching rolls at a temperature of 60° C. and a draw ratio of 3.4 times, stretched in the transverse direction in a tenter at a temperature of 70° C. and a draw ratio of 3.6 times, and heat treated at a temperature of 200° C. for five seconds to form a biaxially oriented flexible polyester film having a thickness of 75 µm (heat treatment temperature thereof: 185° C.).

The characteristics of the film obtained are shown in Table 3. When the weatherproofing test using a sunshine weather meter was performed, the film indicated an excellent weatherproofing property of the retention of the elongation at break after 500 hours relative to the initial value of 75%, and the strength in piercing and the durability were both good.

EXAMPLE 7

A film was formed in a manner similar to that of Example 1 other than using a PET copolymerized with hydrogenated dimer acid of 15 mol % (Tm: 222° C., Tg: 17° C.) and setting the ratio of lamination thicknesses to 1:10:1, the longitudinal draw ratio to 4.2 times, the transverse draw ratio to 3 times and the heat treatment temperature to 40° C. The obtained film indicated a good heat shrinkage at 100° C. of 30%/41% (longitudinal/transverse) and a low maximum value of a shrinkage stress of 0.8 kg/mm² as shown in Table 4.

EXAMPLE 8

A corona discharge treatment was performed on the film obtained in Example 1, the surface tension was controlled to 54 dyne/cm, and a polyvinylidene chloride (PVDC) solution was applied using a bar coater. After the coating, the film was dried by a hot air oven at a temperature of 100° C. for one minute, and further dried at a temperature of 150° C. for one minute. The thickness of the coated layer was 8 µm, and the film indicated a high barrier property of an oxygen permeation rate of 1.0 cc/m$^2$·day·sheet.

EXAMPLE 9

After an urethane system single-liquid ink multi set produced by Toyo Ink Corporation was printed by a gravure roll on the film having a surface tension of 54 dyne/cm which had been obtained in Example 5, the film was introduced into a hot air oven and dried therein at a temperature of 70° C. for two minutes, and immediately after the drying, a cellophane tape peeling test was performed and the bonding strength of the ink was determined. As a result, the ink was not peeled and the film indicated a good bonding strength.

EXAMPLE 10

When the film having a surface tension of 54 dyne/cm and a thickness of 25 µm which had been obtained in Example 4 is formed into an adhesive tape using a synthesized rubber adhesive agent (BPS-4300, produced by Toyo Ink Corporation), the tape could be easily cut by a cutter and the cut portion was beautiful. Further, when the tape was wound spirally on a wire with a diameter of 2 mm and the wire with the tape was repeatedly bent, the tape did not peel and the winding formation thereof was maintained to be good.

EXAMPLE 11

A coating (coating of a releasing layer, a protective layer and a bonding layer) was performed on the film obtained in Example 1 to prepare a transfer foil. The appearance of the foil observed after the film obtained was transferred onto a metal mold (contraction ratio: 0.2) was extremely beautiful.

EXAMPLE 12

Using terephthalic acid of 85 mol % and hydrogenated dimer acid with a carbon number of 36 of 15 mol % as a dicarboxylic acid component and ethylene glycol of 100 mol % as a diol component, copolymerized polyester A (Tm: 222° C., Tg: 17° C.) with an intrinsic viscosity of 0.75 (determined at 25° C. using o-chlorophenol) was prepared by a known method. On the other hand, using terephthalic acid of 90 mol % and sebacic acid of 10 mol % as a dicarboxylic acid component and ethylene glycol of 100 mol % as a diol component and adding silicon oxide particles having a mean particle diameter of 2 µm so that the content thereof was 15% by weight, polyester B (Tm: 233° C., Tg: 55° C.) with an intrinsic viscosity of 0.70 was prepared by a known method.

After these two kinds of copolymerized polyesters were dried by a known vacuum dryer, polyester A was supplied to an extruder with a diameter of 250 mm and polyester B was supplied to an extruder with a diameter of 60 mm, and polyester A was melt-extruded at 260° C. and polyester B was melt-extruded at 285° C. After the polyesters were laminated so as to be in a three-layer lamination structure of polyester B/polyester A/polyester B (ratio of lamination thicknesses: 1:30:1), the polymer was enlarged in the width direction in a die, and the polymer was delivered out from a slit with a width of 1.0 mm of the die in a form of a sheet. The sheet was cast, cooled and solidified on a casting drum controlled at 25° C. applying an electrostatic charge. The sheet was then stretched in the longitudinal direction by stretching rolls at a temperature of 60° C. and a draw ratio of 3.3 times, and thereafter, a corona discharge treatment was performed. After the following releasing agent dispersed in water was coated, the film was dried in a tenter at a temperature of 80° C., and thereafter, the film was stretched in the transverse direction in the tenter at a draw ratio of 3.3 times and heat treated at a temperature of 210° C. for five seconds to form a biaxially oriented flexible polyester film having a thickness of 15 µm (coating thickness: 0.08 µm).

[Composition of the releasing agent]
(a) plant system wax: 50 parts by weight
[an ester compound of hydrogenated rosin-αβ-substituted ethylene (α-substitution group: carboxyl, β-substitution group: methyl) added material-alkyl (carbon number: 6) poly (repeated unit: 5) alcohol]
(b) wax oxide: 50 parts by weight To form a water dispersion of the above-described (a) and (b), a non-ionic surface active agent, a phosphate (butoxyethyl compound), oleic ammonium and 2-amino-2-methylpropanol were added at a content of 1 part by weight, respectively, and the mixture was stirred in water. Further, the mixture was treated by an ultrasonic dispersing apparatus to prepare a water dispersion with a total solid ratio of 1.0% by weight.

In order to estimate the surface coated with the releasing agent thus obtained as a cover film for a photo resist for a photosensitive printing plate of DFR, the film was wound in a form of a roll at a long length, roll-pressing the photo resist layer, which was formed by being applied on the base film of a biaxially oriented polyethylene terephthalate film and being dried (formed from a combination of a monomer, a oligomer or a polymer having an epoxy group and a diazonium salt), under a condition of a yellow lamp with a temperature of 20° C. at a room temperature.

When the film was estimated on the characteristics of film quality and as a cover film, the film had a rough surface and few protrusions originating from foreign materials such as a gel and a fish eye, and it was excellent in the peeling property to the photo resist. Further, the air flowability for DFR was good, and the self-crosslinkage due to the oxygen deficiency of the photo resist near a core did not occur.

Comparative Example 1

A single-layer PET film was formed under a condition of a longitudinal stretching temperature of 100° C., a longitudinal draw ratio of 3.5 times, a transverse stretching temperature of 110° C., a transverse draw ratio of 3.4 times and a heat treatment temperature of 220° C. Because the film obtained was large in Young's modulus, low in strength in piercing and poor in Gelbo property, the results of both package test and package drop test were not good, as shown in Table 1.

Comparative Example 2

Using terephthalic acid of 85 mol % and hydrogenated dimer acid with a carbon number of 36 of 15 mol % as a dicarboxylic acid component and ethylene glycol of 35 mol % and 1,4-butanediol of 65 mol % as a diol component, copolymerized polyester A (Tm: 175° C., Tg: −7° C.) with an intrinsic viscosity of 0.75 was prepared by a known method. A single-layer non-oriented film with a thickness of 25 µm was formed using the polyester A. Because the strength in piercing of the film obtained decreased and the Gelbo property thereof was poor, the results of both package test and package drop test were not good, as shown in Table 1.

Comparative Example 3

A film was formed in a manner similar to that of Example 1 other than changing the polyester A to a PET copolymerized with sebacic acid of 10 mol % (Tm: 233° C., Tg: 55° C.) and setting the ratio of lamination thicknesses to 2:1:2. Because the strength in piercing of the film obtained decreased and the Gelbo property thereof was poor, the results of both package test and package drop test were not good, as shown in Table 1.

Comparative Example 4

A single-layer film was formed using a PET copolymerized with sebacic acid of 20 mol % (Tm: 218° C., Tg: 34° C.) as polyester A, controlling a stretching temperature to 50° C. and performing a heat treatment at a temperature to 220° C. for seven seconds. Because the strength in piercing and the Gelbo property of the film obtained were poor, the results of both package test and package drop test were not good, as shown in Table 1.

Comparative Example 5

A biaxially oriented nylon film (15 μm) was deposited in a manner similar to that of Example 5. The moisture absorption rate of the film obtained was high, a curl occurred, the vacuum degree slightly decreased, and the film indicated a low gas barrier property of a water vapour permeation rate of 3.8 g/m$^2$·day·sheet sheet and an oxygen permeation rate of 2.5 cc/m$^2$·day·sheet.

Comparative Example 6

A film was formed in a manner similar to that of Example 5 other than using a PET instead of polyester A in Example 5 and setting a temperature for melting to 280° C., a temperature for longitudinal stretching to 90° C. and a temperature for transverse stretching to 100° C. The film obtained indicated a low seal strength of 1.0 kg/cm as shown in Table 2.

Comparative Example 7

A film having a thickness of 75 μm was formed by adding a benzophenone system ultraviolet absorbent (product name: "Mark LA") to the PET used in Comparative Example 1 at a content of 1.5% by weight relative to the weight of the polymer. The durability of the film obtained was low as shown in Table 3.

Comparative Example 8

A film was formed by setting a draw ratio for longitudinal stretching to 4.1 times, a draw ratio for transverse stretching to 3 times and a temperature for heat treatment temperature to 50° C. in Comparative Example 1. The heat shrinkage of the film obtained was 28%/31% (longitudinal/transverse), the film indicated a high maximum value of shrinkage stress of 1.2 kg/mm$^2$, and when an aluminum container was packed by the film, a deformation occurred.

Comparative Example 9

An adhesive tape was prepared in a manner similar to that of Example 10, using the PET film of Comparative Example 1. The obtained film was wound spirally onto a wire having a diameter of 2 mm, and further the wire was repeatedly bent. As a result, the tape peeled from the wire and the winding formation thereof deteriorated.

Comparative Example 10

A transfer foil was obtained in a manner similar to that of Example 11, using the PET film of Comparative Example 1. There occurred wrinkles in the foil after transferring to a metal mold (contraction ratio: 0.2).

TABLE 1

(No.1)

|  | Example 1 | Example 2 | Example 3 |
|---|---|---|---|
| Polyester A | PET/D$^{10}$ | PET/S$^{20}$ | PET/D$^{10}$ |
| Melting point (°C.) | 234 | 218 | 234 |
| Glass transition temperature (°C.) | 33 | 34 | 33 |
| Polyester B | PET | PET | PET |
| Melting point (°C.) | 258 | 258 | 258 |
| Glass transition temperature (°C.) | 76 | 76 | 76 |
| Thickness (μm) | 15 | 15 | 15 |
| Ratio of thicknesses (B/A/B) | 1/20/1 | 1/20/1 | 1/10/1 |
| Young's modulus (kg/mm$^2$) | 121/117 | 112/105 | 130/124 |
| Strength at break (kg/mm$^2$) | 13/12 | 12/10 | 13/14 |
| Elongation at break (kg/mm$^2$) | 135/127 | 121/110 | 129/124 |
| Heat shrinkage (%) | 1.0/0.3 | 1.5/1.3 | 0.7/0.2 |
| Haze (%) | 1.7 | 1.8 | 1.7 |
| μd | 0.50 | 0.65 | 0.55 |
| Strength in piercing (kg/mm) | 21(68) | 12(53) | 19(62) |
| Gelbo test | 0 | 6 | 0 |
| Package test | A | B | A |
| Package drop test | 0/10 | 3/10 | 0/10 |

No. 2

|  | Comparative Example 1 | Comparative Example 2 | Comparative Example 3 | Comparative Example 4 |
|---|---|---|---|---|
| Polyester A | — | P(E$^{35}$/B$^{65}$)/(T$^{65}$/D$^{15}$) | PET/S$^{10}$ | PET/S$^{20}$ |
| Melting point (°C.) | — | 175 | 233 | 218 |

TABLE 1-continued

| | | | | |
|---|---|---|---|---|
| Glass transition temperature (°C.) | — | −7 | 55 | 34 |
| Polyester B | PET | — | PET | — |
| Melting point (°C.) | 258 | — | 258 | — |
| Glass transition temperature (°C.) | 76 | — | 76 | — |
| Thickness (μm) | 15 | 25 | 15 | 15 |
| Ratio of thicknesses (B/A/B) | — | — | 2/1/2 | — |
| Young's modulus (kg/mm$^2$) | 410/400 | 16/15 | 353/361 | 241/232 |
| Strength at break (kg/mm$^2$) | 28/26 | 4/3.5 | 24/23 | 13/15 |
| Elongation at break (kg/mm$^2$) | 109/108 | 680/672 | 111/113 | 145/158 |
| Heat shrinkage (%) | 0.4/0.2 | 0.1/0.1 | 0.5/0.7 | 0.8/0.6 |
| Haze (%) | 1.6 | 1.9 | 1.8 | 1.9 |
| μd | 0.31 | 1.2 | 0.48 | 0.91 |
| Strength in piercing (kg/mm) | 8.7(43) | 9.1(49) | 8.4(41) | 9.5(48) |
| Gelbo test | 58 | 32 | 29 | 17 |
| Package test | C | C | C | C |
| Package drop test | 9/10 | 5/10 | 8/10 | 4/10 |

In a single-layer film, PET is described as polyester B, and P(E/B)(T/D) is described as polyester A, in the Table.
Mechanical properties are represented as longitudinal property/transverse property.
Abbreviated names in the Table are as follows.
(Numerals on the right upper sides of the names represent mol % of copolymerized components.)
PET: polyethylene terephthalate
PET/D: polyethylene terephthalate copolymerized with hydrogenated dimer acid
PET/S: polyethylene terephthalate copolymerized with sebacic acid
P(E/B)(T/D): (ethylene glycol/butanediol) (terephthalic acid/dimer acid) copolymer

TABLE 2

| | Example 5 | Comparative Example 6 |
|---|---|---|
| Thickness (μm) | 20 | 20 |
| Young's modulus (kg/mm$^2$) | 84/91 | 312/308 |
| Strength at break (kg/mm$^2$) | 10/11 | 22/23 |
| Elongation at break (kg/mm$^2$) | 141/135 | 114/110 |
| Strength in piercing (kg/mm) | 14(58) | 9(40) |
| Heat seal strength (kg/cm) | 2.1 | 1.0 |

TABLE 3

| | Example 6 | Comparative Example 7 |
|---|---|---|
| Thickness (μm) | 75 | 75 |
| Young's modulus (kg/mm$^2$) | 87/80 | 380/391 |
| Strength at break (kg/mm$^2$) | 11/10 | 26/25 |
| Elongation at break (kg/mm$^2$) | 151/150 | 110/109 |
| Strength in piercing (kg/mm) | 19(71) | 8.5(41) |
| Retention of elongation (%) | 75 | 73 |
| Haze (%) | 3.2 | 5.4 |
| Durability | A | C |

TABLE 4

| | Example 7 | Comparative Example 8 |
|---|---|---|
| Thickness (μm) | 15 | 15 |
| Young's modulus (kg/mm$^2$) | 112/105 | 460/440 |
| Strength at break (kg/mm$^2$) | 12/13 | 27 |
| Elongation at break (kg/mm$^2$) | 132/125 | 128/119 |
| Heat shrinkage (%) | 30/41 | 28/31 |
| Shrinkage stress (kg/mm$^2$) | 0.8 | 1.2 |

TABLE 5

| | Comparative Example 13 |
|---|---|
| Polyester A | PET/D$^{15}$ |
| Melting point (°C.) | 222 |
| Glass transition temperature (°C.) | 17 |
| Polyester B | PET/S$^{10}$ |
| Melting point (°C.) | 233 |
| Glass transition temperature (°C.) | 55 |
| Thickness (μm) | 15 (coating layer 0.08 μm) |
| Ratio of thicknesses (B/A/B) | 1/30/1 |
| Young's modulus (kg/mm$^2$) | 81/80 |
| Surface wetting tension (dyne/cm) | 28 |
| Haze (%) | 25 |
| PC-1 (number/mm) | 55 |
| Self-crosslinkage | ○ |
| Peeling property | ○ |

INDUSTRIAL APPLICATIONS OF THE INVENTION

The biaxially oriented, laminated polyester film according to the present invention not only is suitable to uses for a package for liquids and a package for solid materials such as rice for which a biaxially oriented nylon film has been used, or uses in which a polyester film represented by a PET film has been used and which require a flexibility and a resistance to pinhole generation, but also can be employed in various uses aforementioned.

We claim:

1. A biaxially oriented, laminated polyester film having a Young's modulus of 10–250 kg/mm$^2$ and formed by laminating layers of a polyester B on both surfaces of a layer of a polyester A whose main constituent is an ethylene terepthalate having a glass transition temperature of not more than 50° C., wherein said polyester A contains a long-chain aliphatic dicarboxylic component having an alkylene group of a carbon number of not less than 8 at a content of 1–40 mol %.

2. The biaxially oriented, laminated polyester film according to claim 1, wherein said long-chain aliphatic dicarboxylic component is a dimer acid component.

* * * * *

UNITED STATES PATENT AND TRADEMARK OFFICE
CERTIFICATE OF CORRECTION

PATENT NO. : 5,747,174
DATED : May 5, 1998
INVENTOR(S) : Masahiro Kimura, et al

It is certified that error appears in the above-identified patent and that said Letters Patent is hereby corrected as shown below:

In Column 4, line 5, please change "viewpoints" to --viewpoint--.

In Column 6, line 5, please change "a" to --the--, first occurrence.

In Column 19, at Comparative Example 5, at approximately line 28, please change "Example 5" to --Example 4--.

Signed and Sealed this

Nineteenth Day of January, 1999

Attest:

*Attesting Officer*

*Acting Commissioner of Patents and Trademarks*